Feb. 12, 1929.
E. A. MOGEN
1,701,789
DIRIGIBLE HEADLIGHT FOR AUTOMOBILES
Filed March 11, 1927
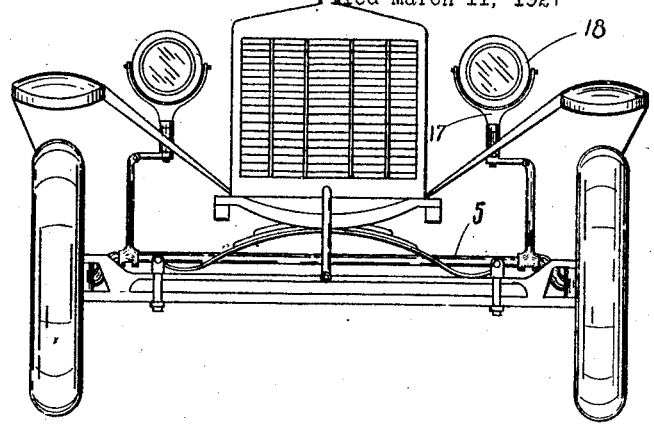
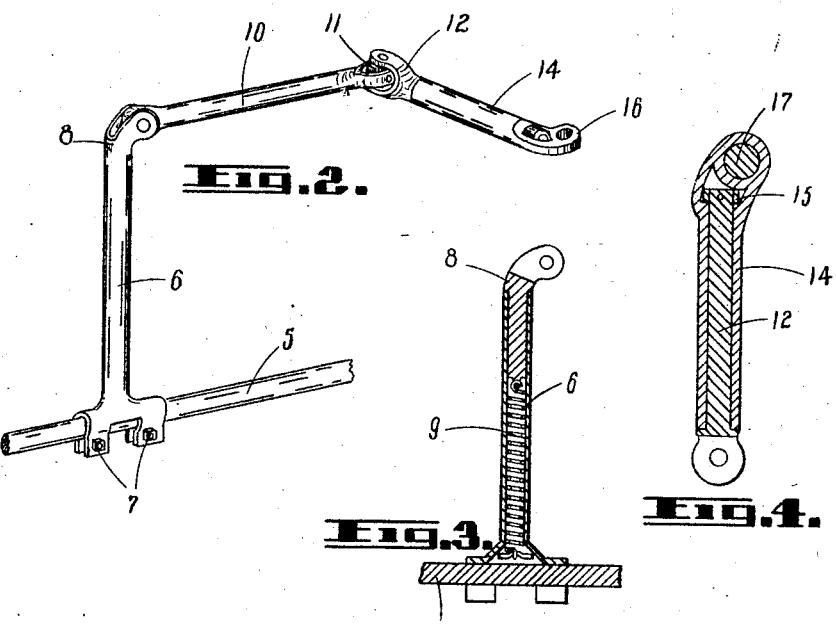
Edward A. Mogen,
INVENTOR.
BY Harold C. Shipman
ATTORNEY.

Patented Feb. 12, 1929.

1,701,789

UNITED STATES PATENT OFFICE.

EDWARD ANDREW MOGEN, OF WATROUS, SASKATCHEWAN, CANADA.

DIRIGIBLE HEADLIGHT FOR AUTOMOBILES.

Application filed March 11, 1927. Serial No. 174,668.

This invention relates to new and useful improvements in dirigible headlights for automobiles and has for its primary object the provision of an attachment for controlling lights, which attachment will be of simple and inexpensive construction, yet, highly efficient in operation.

The main object of my invention is to provide a construction which can be readily applied to motor vehicles already in use without serious alterations and by which each headlight may be connected directly to the main rod of the steering mechanism of the vehicle, so that when the front wheels of the vehicle are turned, the lights will be turned in a corresponding direction.

With the foregoing and other objects in view, as will appear as the description proceeds, the invention consists in the novel construction, combination and arrangement of co-operating elements as hereinafter more specifically set forth, claimed and shown in the accompanying drawings forming a part of the present application, in which:

Fig. 1 is a front elevation looking on to a motor vehicle and showing the preferred embodiment of my invention.

Fig. 2 is an enlarged detailed view of the preferred embodiment of my invention, one end of which is attached to the main rod of the steering mechanism.

Fig. 3 is a sectional view of the main rod connecting member.

Fig. 4 is a sectional view of the light arm connecting member.

Like numerals of reference designate corresponding parts throughout the different views.

The disclosure in this application is shown as being mounted on a Ford automobile. 5 indicates the main rod of the steering mechanism. 6 indicates a sleeve, the lower end of which is provided with clamping means 7, which is adapted to be clamped over the main rod 5. 8 indicates a pivotally mounted pin, its upper end being bifurcated, while its lower end is of a slightly less diameter and mounted to turn in the upper end of the sleeve 6. A coil spring 9 in the lower end of the sleeve 6 retains the pin 8 in its pivotal position in the sleeve 6. 10 indicates a connecting arm, one end of which is pivotally connected in the bifurcated end of the pin 8, while the other end is connected to the universal ball 11 forming an universal joint between this end and the end of the pin 12. The pin 12 is fitted and adapted to rotate in the sleeve 14. The pin 12 is held against longitudinal movement by the nut 15 threadedly engaged to its inner end. The sleeve 14 is provided with an integral portion 16 having a transverse opening, which opening is adapted to engage over the lower end stem 17, which stem is equipped with appropriate means for supporting the headlight 18.

I am well aware that there are different constructions that provide dirigible headlights for automobiles, but the present construction as disclosed in this application embodies certain elements with a flexibility throughout their connections which will give a much more efficient result. The construction can be easily adapted when a vehicle is being manufactured or to one which is now in use.

The foregoing specification and annexed drawings disclose the preferred embodiment of my invention, but it is to be understood that minor changes may be resorted to in the commercial adaptation of my invention without departing from the scope of the invention as hereinbefore claimed.

What I claim as new is:

The combination in an automobile embodying a main cross rod in the steering mechanism; an upright sleeve fixed to and movable by said rod; a pivotal pin mounted vertically in the upper end of said sleeve; a tension spring holding said pin in normal position in said sleeve; a connecting arm having one end pivotally engaged to said pin; an upright shaft journalled in and supported by a bearing carried by one of the fenders on said automobile and equipped with a lamp; a sleeve having a protruding end secured to the lower end of said shaft; a pin rotatably mounted in said sleeve and an universal joint connection between said last mentioned pin and said connecting arm.

In testimony whereof, I affix my signature.

EDWARD ANDREW MOGEN.